United States Patent [19]

DelDonno

[11] 4,426,510

[45] Jan. 17, 1984

[54] POLYURETHANE PREPARATION USING ORGANO-ZINC CATALYST AND TIME-LAPSE MODIFIER

[75] Inventor: Theodore A. DelDonno, North Wales, Pa.

[73] Assignee: Rohm and Haas Company, Philadelphia, Pa.

[21] Appl. No.: 405,222

[22] Filed: Aug. 5, 1982

[51] Int. Cl.$^3$ .................. C08G 18/16; C08G 18/22
[52] U.S. Cl. .................................. 528/49; 528/52; 528/55; 528/75; 528/905; 521/113; 521/128
[58] Field of Search .............. 528/49, 52, 55, 75, 528/905

[56] References Cited

U.S. PATENT DOCUMENTS

| | | | |
|---|---|---|---|
| 3,314,834 | 4/1967 | Walden | 149/19.4 |
| 3,468,860 | 9/1969 | Hsieh | 526/188 |
| 3,635,906 | 1/1972 | Jayawant | 528/58 |
| 3,694,389 | 9/1972 | Levy | 524/765 |
| 4,115,634 | 9/1978 | Bechara et al. | 528/52 |
| 4,184,031 | 1/1980 | Graham et al. | 528/55 |
| 4,322,327 | 3/1982 | Yoshimura et al. | 528/49 |
| 4,373,057 | 2/1983 | Hammond | 528/52 |

*Primary Examiner*—H. S. Cockeram
*Attorney, Agent, or Firm*—Michael B. Fein

[57] ABSTRACT

Coating or adhesive composition having extended pot life and short cure time comprising an organic polyol, an organic polyisocyanate, an organo-zinc cure rate catalyst, and a compound selected from (a) beta-dicarbonyl compounds, (b) alpha-hydroxy ketones, (c) fused aromatic beta-hydroxy ketones, and (d) beta-hydroxy nitrogen-heterocyclic fused aromatics.

Also disclosed are methods of preparing such coating or adhesive compositions, cured coatings and adhesives, and articles containing said coating or adhesive.

20 Claims, No Drawings

POLYURETHANE PREPARATION USING ORGANO-ZINC CATALYST AND TIME-LAPSE MODIFIER

BACKGROUND OF THE INVENTION

1. Field of the Invention

This invention relates to urethane coatings and urethane adhesive compositions.

2. Description of the Prior Art

Jayawant U.S. Pat. No. 3,635,906 discloses a method of preparing polyurethanes by time-lapse catalysis which comprises mixing an organic polyisocyanate, a polyhydroxy compound, and amine-free organo tin cure rate catalyst for the polyurethane reaction, and a time-lapse modifier selected from beta-dicarbonyl compounds, alpha-hydroxy ketones, fused aromatic beta-hydroxy ketones and beta-hydroxy nitrogen-heterocyclic fused aromatics, and allowing the reaction mixture to cure at ambient temperature. Jayawant teaches that no other cure rate catalyst can be used except amine-free organo-tin.

SUMMARY OF THE INVENTION

It has been discovered that rather than using the "amine-free organo-tin cure rate catalysts" of Jayawant, in coatings and adhesive compositions wherein extended pot life and short cure time are advantageous, an organo-zinc cure rate catalyst works extremely well. Therefore, the present invention comprises coating or adhesive compositions having extended pot life and short cure time comprising an organic polyol, an organic polyisocyanate, an organo-zinc cure rate catalyst, and a compound selected from (a) beta-dicarbonyl compounds, (b) alpha-hydroxy ketones, (c) fused aromatic beta-hydroxy ketones, and (d) beta-hydroxy nitrogen-heterocyclic fused aromatics. The invention also comprises a method of preparing a coating or adhesive composition having extended pot life and short cure time comprising mixing an organic polyol, an organic polyisocyanate, an organo-zinc cure rate catalyst, and a compound selected from (a) beta-dicarbonyl compounds, (b) alpha-hydroxy ketones, (c) fused aromatic beta-hydroxy ketones, and (d) beta-hydroxy nitrogen-heterocyclic fused aromatics. The invention also comprises cured coatings and cured adhesives and articles containing said coatings or adhesives prepared from these compositions.

DETAILED DESCRIPTION OF THE INVENTION AND THE PREFERRED EMBODIMENTS

Conventional urethane coatings and adhesives are catalyzed by various metal and/or amine catalysts. These catalysts accelerate the cross-linking reaction between the hydroxyl group of a polyol and the isocyanate to provide rapid ambient cure of the films. However, when one uses the typical catalyst systems, especially high solid systems, pot lives of less than one hour result. In commercial practice, pot lives of at least seven hours, or one working shift, shorter cure times are also desirable, and cure times of around 5.5 hours and less are very desirable.

The organic polyol compounds component of the polyurethanes of the invention include simple aliphatic polyols such as ethylene glycol, 1,2-propylene glycol, 1,3-butylene glycol, 2,3,-butylene glycol, tetramethylene glycol, pentamethylene glycol, hexamethylene glycol, decamethylene glycol, 2,2-dimethyltrimethylene glycol, glycerine, trimethylolethane, trimethylolpropane, pentaerythritol, sorbitol, 1,6-hexanediol, 1,2,6-hexanetriol, 2-ethyl-1,3-hexanediol, castor oil, polyvinyl alcohol and partially hydrolyzed polyvinyl acetate; carbohydrates containing 5 to 8 hydroxyl groups such as sucrose, dextrose, and methylglucoside; ether polyols such as diethylene glycol and dipropylene glycol; aromatic polyols such as diphenylene glycol; and mixtures thereof.

Suitable higher molecular weight organic polyhydroxy compounds are the polyether polyols prepared by reaction of any of the above polyols with an alkylene oxide such as ethylene oxide, 1,2-propylene oxide, 1,3-propylene oxide, epichlorohydrin, epibromohydrin, 1,2-butene oxide and tetrahydrofuran. These polyether polyols are described by Price in U.S. Pat. No. 2,886,774 and include polyethylene glycol, polypropylene glycol and polyetratmethylene ether glycol.

An additional class of high molecular weight polyhydroxy compounds for use in accordance with this invention are the polyester polyols prepared by reaction of more than one, but not more than two, hydroxyl equivalent weights of any of the above polyols with one equivalent weight of a polycarboyxlic acid such as diglycolic, succinic, glutaric, adipic, suberic, azelaic, sebacic, phthalic, isophthalic, terephthalic, chloroendic and pyromellitic acids. Other high molecular weight polyhydroxy compounds include hydroxyalkyl acrylate and methacrylate monomers and polymers, including copolymers with aromatic compounds containing an ethylenically unsaturated side chain such as those described by Mayer et al in U.S. Pat. No. 3,245,941.

A preferred combination of polyol and polyisocyanate for use with the time-lapse catalysis of this invention is an acrylic polyol polymer of (1) one or more of an ester of acrylic or methacrylic acid with an alkanol of 1–18 carbon atoms, acrylonitrile, methacrylonitrile, styrene, alpha methyl styrene, vinyl toluene, vinyl chloride or vinyl fluoride;

(2) one or more of hydroxyethyl acrylate, hydroxypropyl acrylate, hydroxyethyl methacrylate or hydroxypropyl methacrylate; and (3) from 0% to 10%, by weight of acrylic or methacrylic acid, in combination with an aliphatic or cycloaliphatic polyisocyanate.

A particularly preferred combination is a butyl methacrylate/hydroxyethyl acrylate 50–80/20–50 polyol polymer or a methyl methacrylate/hydroxyethyl methacrylate 50–90/10–50 polyol polymer in combination with hexamethylene diisocyanate biuret.

In many cases the polyhydroxy compound and the polyisocyanate are pre-reacted to form a polyhydroxy- or polyisocyanate-terminated quasi-prepolymer. These prepolymers are used for various reasons such as to reduce the exotherm of the final polymerization reaction, to reduce the toxicity of monomeric polyisocyanates, or to reduce the viscosity of a particular polyol or polyisocyanate by reacting it with a more liquid polyisocyanate or polyol. Polyhydroxy-terminated prepolymers are prepared by reacting a polyol with less than a stoichiometric amount of polyisocyanate. Polyisocyanate-terminated prepolymers are prepared by reacting a polyisocyanate with less than a stoichiometric amount of a polyol.

Suitable organic polyisocyanates for use in accordance with this invention include aliphatic diisocyanates such as trimethylene diisocyanate, tetramethylene diisocyanate, pentamethylene diisocyanate, hexamethylene diisocyanate, octamethylene diisocyanate, decamethylene diisocyanate, butylene-1,2-diisocyanate, butylene-1,3-diisocyanate, ethylidene diisocyanate, cycloaliphatic diisocyanates such as cyclohexylene diisocyanate, 4,4'-methylene bis(cyclohexyl isocyanate), 2,2,4-trimethylhexamethylene diisocyanate, dimer acid diisocyanate, 3-isocyanatomethyl-3,5,5-trimethylcyclohexyl-isocyanate, and aromatic diisocyanates such as 2,4-toluene diisocyanate, 2,6-toluene diisocyanate, chlorinated toluene diisocyanates, meta-phenylene diisocyanate, chlorinated meta-phenylene diisocayanetes, orthophenylene diisocyanate, brominated-meta-phenylene diisocyanate, meta-xylylene diisocyanate, para-xylylene diisocyanate, naphthalene-1,4-diisocyanate, naphthalene-1,5-diisocyanate, naphthalene-2,7-diisocyanate, 4'4-biphenylene diisocyanate, 3,3'-dichloro'4,4'-biphenylene diisocyanate, 3,3'-dimethyl-4,4'-biphenyl diisocyanate,3,3'-dimethoxy-4,4'-biphenylene diisocyanate,2,2',5,5'-tetramethyl-4,4'-biphentlene diisocyanate,2-nitro-4,4'biphenylene diisocyanate,3,3'-diphenyl-4,4'-biphenylene diisocyanate,4,4'-methylene-bis-(phenyl isocyanate), 4,4'-methylene-bis(2-methylphenyl isocyanate), 4,4'-isopropylene-bis(phenyl isocyanate), and fluorene diisocyanate; triisocyanates such as hexamethylene diisocyanate biurets, 4,4',4''-triphenylmethane triisocyanate and toluene-2,4,6-triisocyanate; isocyanurates such as those based on hexamethylene diisocyanate or 3-isocyanatomethyl-3,5,5-trimethylcyclohexyl-isocyanate; tetraisocyanates and mixtures thereof.

In the final polymerization, the organic polyisocyanate is generally reacted with substantially a stoichiometric amount of organic polyhydroxy compound. However, in some cases, such as in the case of many adhesives, prime coatings, etc., it may be desirable that there may be free hydroxyl or free isocyanate groups in the final polymer. In those cases, an excess of polyisocyanate or polyhydroxy compound is used. Generally, the amount of organic nolyhydroxy compound used will be about 0.5 to 1.5 equivalent weight per equivalent weight of organic polyisocyanate. For this purpose, an equivalent weight of polyhydroxy compound is the molecular weight divided by the number of hydroxyl groups per molecule. Correspondingly an equivalent of polyisocyanate is the molecular weight of the polyisocyanate divided by the number of isocyanate groups present per molecule. Preferably, about 0.9 to 1.1 equivalent polyhydroxy compound is present for each equivalent of polyisocyanate.

One class of time-lapse modifier for use in accordance with this invention is beta-dicarbonyl compounds having an enol content of at least about 4% and a dicarbonyl angle of not greater than about 120 degrees. By "enol content" is meant the enol content measured at 25° C. as the pure compound rather than as a solvent solution. It has been found that beta-dicarbonyl compounds having a large enol contribution to the keto-enol equilibrium give a greater time-lapse effect than ones having a small contribution. An enol content of at least about 4% is required to provide significant results. An example of a beta-dicarbonyl compound having an enol content below about 4% is diethylmalonate. Preferably the beta-dicarbonyl compound has an enol content of at least about 30%.

By "dicarbonyl angle" is meant the angle formed by the intersecting of a line extending from the carbonyl oxygen through the carbonyl carbon of the carbonyl group with a line extending form the hydroxyl oxygen through the hydroxyl carbon in a model of the compound in the enol form. When these lines are parallel, as in the case of 2,4-pentanedione, they intersect at infinity whereby the dicarbonyl angle is zero. These lines are assumed to be in the same plane since the enol form the five atoms in the basic structure.

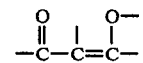

are in the same plane. Examples of compounds having a dicarbonyl angle in excess of 120 degrees are 1,3-indandione and 1,3-cyclobutanedione.

One preferred class of beta-dicarbonyl compounds is beta-diketones of the formula

in which R is hydrogen, lower-alkyl or aryl, Y and Y' are aryl or —CXX'B wherein X and X' are hydrogen or halogen, and B is hydrogen, halogen or lower-alkyl. Typical beta-diketones of this structure include:
2,4-pentanedione,
1,1,1-trifluoro-2,4-pentanedione,
1,1,1,5,5,5-hexafluoro-2,4-pentanedione,
2,4-hexanedione,
2,4-heptanedione,
5-methyl-2,4-hexanedione
2,4-octanedione,
5,5-dimentyl-2,4-hexanedione,
3-ethyl-2,4-pentanedione,
2,4-decanedione,
2,2-dimethyl-3,5-nonanedione,
3-methyl-2,4-pentanedione,
2,4-tridecanedione,
1-1-cyclohexyl-1,3-butanedione,
5,5-dimethyl-1,3-cyclohexanedione,
1,3-cyclohexanedione,
1-phenyl-1,3-butanedione,
1(4-biphenyl)-1,3-butanedione,
1-phenyl-1,3-pentanedione,
3-benzyl-2,4,-pentanedione,
1-phenyl-5,5-dimethyl-2,4-hexanedione,
1-phenyl-2-butyl-1,3-butanedione,
1-phenyl-3-(2-methoxyphenyl)-1,3-propanedione,
1-(4-nitrophenyl)-1,3-butanedione,
1-(2-furyl)-1,3-butanedione,
1-(tetrahydro-2-furyl)-1,3-butanedione and dibenzoylmethane.

Another preferred class of beta-dicarbonyl compound is beta-keto esters of the formula

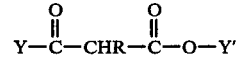

in which R is hydrogen, lower-alkyl or aryl, Y and Y' are aryl or —CXX'B wherein X and X' are hydrogen or halogen, and B is hydrogen, halogen or lower-alkyl. Typical examples of these esters are methyl acetoacetate, ethyl acetoacetate, alpha-methyl ethylacetoacetate, alpha-n-butyl ethylacetoacetate, alpha-secbutyl ethylacetoacetate, alpha ethyl methylacetoacetate, and alpha-ethyl ethylacetoacetate. Other beta dicarbonyl compounds which are suitable include alpha-acetylbutyrolactone, dimedone and 1-hydroxyanthraquinone.

Another class of suitable time-lapse modifiers is alpha-hydroxy ketones. The preferred alpha-hydroxy ketones are those of the formula:

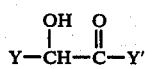

in which Y and Y' are aryl or —CXX'B wherein X and X' are hydrogen or halogen, and B is hydrogen, halogen or lower-alkyl. Typical examples of alpha-hydroxy ketones of this structure include benzoin, acetoin and alpha-hydroxyacetophenone.

Another class of compounds which function as time-lapse modifiers in accordance with this invention are fused aromatic beta-hydroxy ketones in which the hydroxyl group is attached to a carbon in an adjacent ring beta to the keto group.

Typical examples of beta-hydroxy ketones of this type include naphthazarin 1-hydroxy-9-fluorenone and 1-hydroxy anthraquinone.

Still another class of suitable time-lapse modifiers is beta hydroxy nitrogen-heterocyclic fused aromatics in which the hydroxyl group is attached to a carbon in an adjacent ring beta to the nitrogen. The preferred beta-hydroxy nitrogen-heterocyclic fused aromatics are the 8-hydroxyquinolines.

Other fused aromatics of this type include 7-hydroxy-3-hydrogen indoles, 8-hydroxy quinoxalines, 8-hydroxy quinazolines, 8-hydroxy cinnolines, 4-hydroxy phenanthridines, and 4-hydroxy acridines and 1-hydroxy phenazines.

The organo-zinc compound is preferably present in a molar ratio to polyisocyanate of about 0.0001 to 0.1 while said ketone compound is present in a molar ratio of at least 0.1. Preferred organo-zinc compounds are zinc octoate, zinc naphthenate, zinc tallate, zinc ($C_8$–$C_{14}$) carboxylate, and zinc acetate.

In order to increase the mobility of the system, the polyurethane reaction is generally carried out in the presence of at least about 1% by volume, based on the total composition, of a solvent for the polyurethane reaction. By "solvent for the polyurethane reaction" is meant a compound which gives a homogeneous mixture with the polyisocyanate and the polyhydroxy compound, and is inert, that is, does not contain an isocyanate group or a primary or secondary alcohol group which would enter into the polyurethane reaction. There is no upper limit on the amount of solvent which may be present except that imposed by the particular application. Preferably, the solvent is about 5–90% by volume of the total composition and has a boiling point of about 15°–200° C. Most preferably the solvent is about 20–50% by volume of the total composition and has a boiling point of about 100°–170° C.

Suitable solvents include hydrocarbons, esters, ketones, ethers, mixed ether-esters, and tertiary alcohols. Typical examples of suitable hydrocarbon solvents include benzene, chlorobenzene, toluene and xylene.

Suitable ester solvents include the methyl, ethyl, chloro-ethyl, bromoethyl, propyl, isopropyl, butyl and amyl esters of carboxylic acids such as formic, acetic, chloroacetic, trichloroacetic, fluoroacetic, propionic, chloropropionic, acrylic, butyric, isobutyric, methacrylic, valeric, trimethylacetic, caproic, heptanoic, and benzoic acids the corresponding diester of dicarboxylic acids such as oxalic, malonic and succinic acids; cycloaliphatic esters such as gammabutyrolactone, and caprolactone; and glycol esters such as ethylene glycol diacetate and ethylene glycol diformate.

Suitable ketone solvents include aliphatic ketones of the formula:

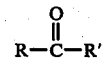

wherein R and R' are lower-alkyl such as methyl, ethyl, propyl, butyl, tertiary butyl, and isobutyl; and cycloaliphatic ketones such as cyclobutanone, cyclopentanone, cyclohexanone, and cycloheptanone.

Suitable other solvents include monoethers of the formula R-O-R' wherein R and R' are aliphatic, such as methyl, chloromethyl, ethyl, chloroethyl, dichloroethyl, bromoethyl, vinyl, propyl, isopropyl, allyl, butyl, amyl, isoamyl, hexyl, heptyl and octyl, or aromatic such as phenyl, tolyl or benzyl; cyclic ethers such as tetrahydrofuran, dioxane and dioxalane; and polyethers such as ethylene glycol dimethylether.

Other suitable solvents include mixed ether-esters such as Cellosolve acetate and methyl Cellosolve acetate; amides such as dimethyl acetamide and dimethyl formamide; carbon disulfide and dimethyl sulfoxide.

The compositions of this invention may also contain other additives such as fillers, pigments, toners, dyes, flow control agents, blowing agents, plasticizers, etc. The amount and type of additive will be determined by the particular application.

Because the compositions of this invention are reactive at room temperature, the total composition should not be mixed together until it is ready for use. These compositions therefore are handled as articles of commerce in the form of multi-package compositions. Each package of the multi-package composition may contain as many of the components as desired, provided the polyhydroxy compound and the polyisocyanate are in separate packages, that is, the polyhydroxy compound is in one package while the polyisocyanate is in another package. For example, one package may contain the polyhydroxy compound and organo-zinc catalyst, and the other package may contain the polyisocyanate and the time-lapse modifier. In another system the polyhydroxy compound, the organo-zinc catalyst and the time-lapse modifier may be in one package and the polyisocyanate may be in the other. The solvent may be in either package or it may be split between two packages. In some cases, it may be desirable to provide a three-package composition, for example, one in which the first package is a solvent solution of the polyhydroxy compound, the second package is a solvent solution of the polyisocyanate, and the third package is a mixture of the organo-zinc cure rate catalyst and the time lapse modifier.

In accordance with the process of this invention, the polyurethane is prepared by
 (1) thoroughly mixing the time-lapse catalyzed reaction mixture described herein,
 (2) applying the reaction mixture such as by molding, casting, foaming, spraying, coating, etc., and
 (3) allowing the applied reaction mixture to cure.

Preferably the reaction mixture is allowed to cure at ambient temperature, that is without external heating or cooling. The time-lapse catalyzed system of this invention is advantageously employed in those instances where the product is cured at ambient temperature, but is not limited thereto. For example, it is also advantageous in situations where extra long pot life or application time is required, but final cure is at elevated temperature.

The following examples, illustrating the novel compositions of this invention and the preparation of polyurethanes therefrom, are given without any intention that the invention be limited thereto. All parts and percentages are by weight unless otherwise specified.

EXAMPLES

EXAMPLE 1 - (Control)

A two package coating composition was prepared as follows:

A mill base was prepared by sand-grinding a mixture composed of 200 parts of rutile titanium dioxide, 185 parts of hydroxyl functional acrylic resin, and 100 parts of n-butyl acetate and ground on a sand mill for 20 minutes. Package one was prepared by mixing 121.3 parts of the mill base with 6.0 parts of hydroxyl functional acrylic resin, 30.0 parts 2,4-pentanedione, 0.28 parts of zinc octoate (8% zinc). Package two consists of 42.0 parts of Desmodur N-75. The coating composition was prepared by mixing 157.6 parts of package 1 with 42.0 parts of package 2.

The resultant pigmented composition which had a catalyst to binder ratio of 0.03:100 and an acrylic-/isocyanate ratio of 58:42. The hydroxyl functional acrylic had a hydroxyl number of 197, a solids of 83.0%, an $M_w$ of 2030 and $M_n$ of 300. The resultant pigmented compositions had an initial viscosity (number 4 Ford cup) of 15 sec., a viscosity after 7 hours of 29 seconds, a set of 30 minutes and a tack free-Zapon (500 grams) of 5.5 hours. The gloss was 88/93, the KHN was 8.9, the impact reverse (inch/pounds) was 4, the impact direct (inch/pounds) was 32, flex (⅛") pass, pencil hardness was 3 H initially and after 30 minutes in xylene was 2 H. Desmodur, N75 is a 75% solution of hexamethylene diisocyanate biuret in a 50/50 Cellosolve acetate/xylene mixture sold by Mobay Chemical Corporation.

EXAMPLE 2

Example 1 was repeated except that the amount of 2,4-pentanedione was reduced to 20.0, and as a result the initial viscosity was 21 seconds, the viscosity after 7 hours was 70 seconds, the KHN was 8.0, the impact reverse was 6, and the impact direct was 34.

Example 3 - (Control)

Example 2 was repeated except that the 2,4-pentanedione was replaced by 20.0 parts of n-butyl acetate. The initial viscosity rose to 24 seconds, the viscosity after 7 hours was gel (actually the composition gelled after 3 hours). The set time was 68 minutes at the tac free-Zapon time was 7 hours. The gloss was 88/94, KHN was 8.3, impact reverse was 2, and impact direct was 30.

Example 4 - (Control)

Example 1 was repeated except a hydroxyl functional acrylic polymer having a hydroxyl number of 130, an acid number of 9.5, $\overline{M}_w = 7100$, and a $\overline{M}_n = 2150$, was used. The sand mill dispersion was prepared by grinding 20 minutes with an equal amount of sand 250 parts TiO₂, 125 parts acrylic resin, and 125 parts n-butyl acetate. The paint composition was prepared from 100.00 parts of the sand mill dispersion, 43.30 parts acrylic resin, 21.75 parts of L-2291 (100%), 29.00 parts n-butyl acetate, 0.56 parts zinc octoate (8% metal).

L-2291 is a biuret of hexamethylene diisocyanate at 100% solids.

Example 5

Example 4 was repeated except 10 parts of the n-butyl acetate was replaced by 10 parts of 2,4-pentanedione.

EXAMPLE 6 (Control)

Example 4 was repeated except a hydroxyl functional acrylic polymer having a hydroxyl number of 130, an acid number of 1.6, a $\overline{M}_w = 7400$, and an $\overline{M}_n = 2500$ was used.

EXAMPLE 7

Example 6 was repeated except 10 parts of the n-butyl acetate was replaced by 10 parts of 2,4-pentanedione.

EXAMPLE 8

The viscosities and film properties of Examples 4–7 were determined as reported in the following table.

| EXAMPLE | 4 | 5 | 6 | 7 |
|---|---|---|---|---|
| Paint | | | | |
| Paint Solids (calculated) | 64.2 | 64.2 | 64.4 | 64.4 |
| Initial Visc., #4 Ford cup | 33" | 33" | 28" | 28" |
| Visc., | | | | |
| 1 hr. | 55" | 42" | 34" | 32" |
| 2½ hrs. | 160" | 59" | 42" | 38" |
| 4½ hrs. | Gel | 109" | 63" | 47" |
| Set Time (finger) | >15' | >15' | >15' | >15' |
| Tack Free Time 0.9 mil | 2¼ hr. | 2½ hr. | 2¾ hr. | 2½ hr. |
| (Zapon, 500 g.) 1.4 mil | 1–12/hr. | 3 hr. | 3 hr. | 4½ hr. |

| Film Properties (7 days air dry) | | | | |
|---|---|---|---|---|
| KHN (tukon Hardness) | 12.1 | 12.1 | 14.5 | 15.6 |
| Gloss: | | | | |
| 20° | 88 | 89 | 88 | 89 |
| 60° | 94 | 93 | 94 | 96 |
| Impact Reverse (in-lbs) | 30+ | 30+ | >40 | 20 |
| Impact Direct (in-lbs) | >40 | >40 | 4 | 2 |
| Flex: ⅛" | Pass | Pass | Pass | Pass |
| Pencil Hardness | | | | |
| Initial | 4H | 4H | 4H | 4H |
| After 30' (xylene) | 4H | 4H | 4H | 4H |
| After 30' (Cellosolve acetate) | 6B | 4B | B | B |
| Knife Adhesion | very good | very good | very good | very good |

EXAMPLE 9

A polyurethane adhesive having extended pot life and a short cure time can be prepared in accordance with the following recipe:

1.125 parts polyisocyanate prepolymer from 12 equivalents of 2,4:2,6 toluene diisocyanate (30:20) and 6 equivalents of 1,2,6-hexanetriol
4.05 parts partially hydrolyzed polyvinyl acetate
2.7 grams ethyl acetate
0.3 grams zinc octoate
2.0 parts 2,4-pentanedione.

What is claimed is:

1. Coating or adhesive composition having extended pot life and short cure time comprising an organic polyol, an organic polyisocyanate, an organo-zinc cure rate catalyst, and a compound effective to extend the pot-life selected from (a) beta-dicarbonyl compounds, (b) alpha-hydroxy ketones, (c) fused aromatic beta-hydroxy ketones, and (d) beta-hydroxy nitrogen-heterocyclic fused aromatics.

2. Composition in accordance with claim 1 wherein the organic polyol is a hydroxyl functional acrylic polymer.

3. Composition in accordance with claim 2 wherein the hydroxyl functional acrylic polymer has a molecular weight, $\overline{M}_n$, of about 200 to 10,000.

4. Composition in accordance with claim 3 wherein said molecular weight is about 500 to 2500.

5. Composition in accordance with claim 2 wherein said hydroxyl functional acrylic polymer has an acid number of about 0.01 to 80.

6. Composition in accordance with claim 5 wherein the acid number is about 0.5 to 30.

7. Composition in accordance with claim 6 wherein the acid number is about 1.5 to 20.

8. Composition in accordance with claim 1 wherein the organo zinc compound is selected from zinc octoate, zinc naphthenate, zinc tallate, zinc ($C_9$–$C_{14}$) carboxylate, and zinc acetate.

9. Composition in accordance with claim 1 wherein said compound is a beta-diketone.

10. Composition in accordance with claim 9 wherein said beta-diketone is selected from the group consisting of 2,4-pentanedione, 1,1,1-trifluoro-2,4-pentanedione, 2,4-hexanedione, 5-methyl-2,4-hexanedione, and dibenzoylmethane.

11. Composition in accordance with claim 2 wherein said hydroxyl functional acrylic polymer is a copolymer of hydroxyalkyl acrylate or hydroxyalkyl methacrylate and a blend of lower alkyl ($C_1$–$C_8$) acrylate or methacrylates.

12. Composition in accordance with claim 11 wherein said copolymer is polymerized from a mixture of hydroxyethyl methacrylate and butyl methacrylate.

13. Composition in accordance with claim 1 wherein said polyisocyanate is selected from the group consisting of biurets, isocyanurates, and isocyanate terminated polyol/isocyanate prepolymers from 2,4-toluene diisocyanate, 1-6 hexamethylene diisocyanate, 3-isocyanotomethyl-3,5,5-trimethylcyclohexyl isocyanate, and 4,4'-methylene bis(cyclohexyl isocyanate).

14. Composition in accordance with claim 1 wherein the hydroxyl functional acrylic polymer has a hydroxyl number of about 50 to 350.

15. Composition in accordance with claim 1 wherein the hydroxy member is about 85 to 250.

16. Composition in accordance with claim 1 wherein the polyol is a blend of said hydroxyl acrylic polyol with simple aliphatic polyols.

17. Method of preparing a coating or adhesive composition having extended pot life and short cure time comprising mixing an organic polyol, an organic polyisocyanate, an effective amount of organo-zinc cure rate catalyst, and an amount of a compound effective to extend the pot-life selected from (a) beta-dicarbonyl compounds, (b) alpha-hydroxy ketones, (c) fused aromatic beta-hydroxy ketones, and (d) beta-hydroxy nitrogen-heterocyclic fused aromatics.

18. Method in accordance with claim 17 wherein said organic polyol is a hydroxyl functional acrylic polymer having a molecular weight, $M_n$, of about 200 to 10,000, an acid number of 0.01 to 80, the equivalent ratio of said polyisocyanate to said polyol is about 0.5 to 1.5, the mole ratio of said catalyst to said polyisocyanate is about 0.0001 to 0.1, and said compound is present in a molar ratio to said catalyst of at least about 0.1.

19. Article coated with the coating of claim 1.

20. Article treated with the adhesive of claim 1.

* * * * *